(12) United States Patent
Bunsmann et al.

(10) Patent No.: US 7,481,458 B2
(45) Date of Patent: Jan. 27, 2009

(54) ROLL-OVER PROTECTION DEVICE FOR A MOTOR VEHICLE

(75) Inventors: Winfried Bunsmann, Bissendorf (DE); Franz Ulrich Brockhoff, Bramsche (DE); Stefan Hoge, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/554,411

(22) PCT Filed: Apr. 20, 2004

(86) PCT No.: PCT/DE2004/000818

§ 371 (c)(1), (2), (4) Date: Oct. 19, 2006

(87) PCT Pub. No.: WO2004/094197

PCT Pub. Date: Nov. 4, 2004

(65) Prior Publication Data

US 2007/0057500 A1 Mar. 15, 2007

(30) Foreign Application Priority Data

Apr. 24, 2003 (DE) .............................. 103 18 594

(51) Int. Cl.
*B60R 21/13* (2006.01)
(52) U.S. Cl. ..................................................... 280/756
(58) Field of Classification Search .................. 280/756
See application file for complete search history.

(56) References Cited

U.S. PATENT DOCUMENTS

| 5,671,947 A | 9/1997 | Henn |
| 6,902,190 B2 * | 6/2005 | Nass ........................... 280/756 |
| 2006/0290125 A1 * | 12/2006 | Kasubke ....................... 280/756 |

FOREIGN PATENT DOCUMENTS

| DE | 195 40 819 A1 | 5/1997 |
| DE | 199 22 674 A1 | 11/2000 |
| DE | 100 44 929 C1 | 9/2001 |
| DE | 100 44 930 C1 | 3/2002 |
| EP | 1 186 481 A2 | 3/2002 |

* cited by examiner

*Primary Examiner*—Faye M. Fleming
(74) *Attorney, Agent, or Firm*—Rothwell, Figg, Ernst & Manbeck P.C.

(57) ABSTRACT

The present invention relates to a roll-over protection device for a motor vehicle, particularly for a convertible, comprising a roll bar (2). This roll bar is provided with an at least nearly U-shaped design having a transverse yoke (3) and lateral limbs (4A, 4B) while leaving a loading opening (11) unobstructed, and extending such that it essentially spans the width of the vehicle. The lateral limbs (4A, 4B) can be displaced along fixed guiding devices (6, 7) in order to transfer the roll bar (2) out of a lowered non-operational position and into a raised supporting position. To this end, a central retaining and activating device (12) for the roll bar (2), said device being controlled by an actuator (18), is provided and/or a device (17) that synchronizes the displacement of the limbs (4A, 4B) of the roll bar (2) along the guiding devices (6, 7) is provided.

5 Claims, 3 Drawing Sheets

ROLL-OVER PROTECTION DEVICE FOR A MOTOR VEHICLE

The present invention relates to a roll-over protection device for a motor vehicle, particularly for a convertible, according to the class defined more elaborately in the preamble of the main claim 1.

The so-called drawer effect can frequently be observed in roll-over protection devices for a motor vehicle that comprise a roll bar that is provided with an at least nearly U-shaped design and that is deployed into a raised supporting position in the event of a crash. Said drawer effect refers to a tilting or even a deadlock of the roll bar during its activation due to manufacturing tolerances or lack of synchronization of the drives engaging at the limbs of the bar. In case of an accident of the motor vehicle, such a drawer effect involves a danger to the vehicle occupants that cannot be put up with.

A roll-over protection device for a motor vehicle of the aforementioned class is described in the patent application DE 195 40 819 C2. This roll-over protection device has a roll bar that stretches essentially over the entire width of the vehicle and can be deployed and swiveled out in the event of a crash. Furthermore, two limbs of the bar that extend parallelly to one another and are impinged with a spring force are each arranged on a side of the vehicle and are connected to one another by means of a continuous bar shell that extends transverse to the vehicle. In order to even out a non-synchronized deployment and swiveling movement of the limbs of the bar, it is hereby suggested to provide the bar shell connecting both the bar limbs with a jointed support.

The patent application DE 197 12 955 A1 also discloses a roll-over protection system for convertibles that comprises a U-shaped roll bar that essentially spans over the entire width of the vehicle. By using a spring drive, the downward-directed limbs of said roll bar can each be displaced in guide cassettes fixed to the vehicle body out of a lowered non-operational position into a supporting position that projects upward over the medium height. In order to avoid the drawer effect, it is suggested that the roll bar be composed of several parts whereby as much movability is provided in the connecting area between the transverse yoke and the lateral limbs so as to avoid a tilting of the bar during deployment.

The deviation from the principle of the single-piece roll bar in favor of a multi-part component having considerable tolerances between the individual parts of the component is common to these known solutions. However, this measure for preventing the drawer effect means putting up with instabilities that can be compensated only by using expensive measures for stabilization and additional mechanical components.

Furthermore, the disadvantage of the above-described roll-over systems as also roll-over protection devices known from practice and experience is that the loading option between the vehicle spaces adjoining the roll-over protection device is frequently very limited due to the drives of the roll bar arranged on both sides and the guiding devices of the roll bar.

The task of the present invention is to create a roll-over protection device for a motor vehicle, particularly for a convertible of the aforementioned class that is characterized by a simple constructive design, a high operational reliability, and great stability in the event of a crash as well as by ample loading option.

This objective is achieved by a roll-over protection device for a motor vehicle according to the characteristics specified in the main claim 1.

The roll-over protection device according to the present invention provides reliable protection particularly to the occupants of a convertible that has a soft or hard top in case the vehicle rolls over. This is feasible because a central retaining and activating device prevents a delayed release of the limbs of the roll bar during the activation of the latter and thus counteracts the so-called drawer effect. In addition or as an alternative to this, a synchronization device acting on both the limbs synchronizes the movement of the limbs along the guiding devices. Due to this it is possible to avoid a tilting or deadlock resulting from the use of different drives of the limbs when the roll bar is deployed.

In comparison to solutions in which each retaining and activating device interacts with one of the limbs in the area of the guiding devices of the limb, the area of the guiding devices of the limbs in the design form according to the present invention with the central retaining and activating device for the roll bar can be provided with a slimmer design. Thus it is possible to achieve a broader loading opening and a corresponding increase and better usability of the trunk volume, for example if the adjoining back rests are folded down.

The roll-over protection device according to the present invention is mechanically very robust and exhibits a very high load capacity in the event of a crash, if the transverse yoke and the limbs of the roll bar are designed as a single piece.

The drive for transferring the roll bar out of a non-operational position into the raised supporting position can be a spring drive mechanism having at least one compression spring that acts on a limb of the roll bar and that is compressed in the non-operational state of the roll bar as is known from practice and experience and has also been described, for example, in the patent application DE 197 12 955 A1.

Alternatively, in a particularly advantageous design form of the roll-over protection, device having a synchronization shaft as a synchronizing device that is fixedly mounted parallelly to the transverse yoke and is connected to each of the limbs by means of a tooth profile that meshes with a notched strip arranged on the assigned limb, the drive for transferring the roll bar out of the non-operational position into the raised supporting position can be provided with a drive element that engages at the synchronization rod.

In this manner it is possible to firstly economize on components since only one drive element is required instead of a separate drive for each of the limbs. Secondly, it is possible to eliminate the danger of a variably strong and/or delayed drive of the limbs that must be evened out using the synchronization rod. Furthermore, a slimmer design of the roll-over protection device in the area of the guiding devices of the limbs is achieved. This consequently provides more space for the loading opening.

Additional advantages and preferred design forms of a roll-over protection device according to the present invention are specified in the description, the drawing, and the claims. Two embodiments of a roll-over protection device designed according to the present invention are explained more elaborately in the following description and are illustrated in the drawing schematically and in a simplified form of which:

Figure 1:
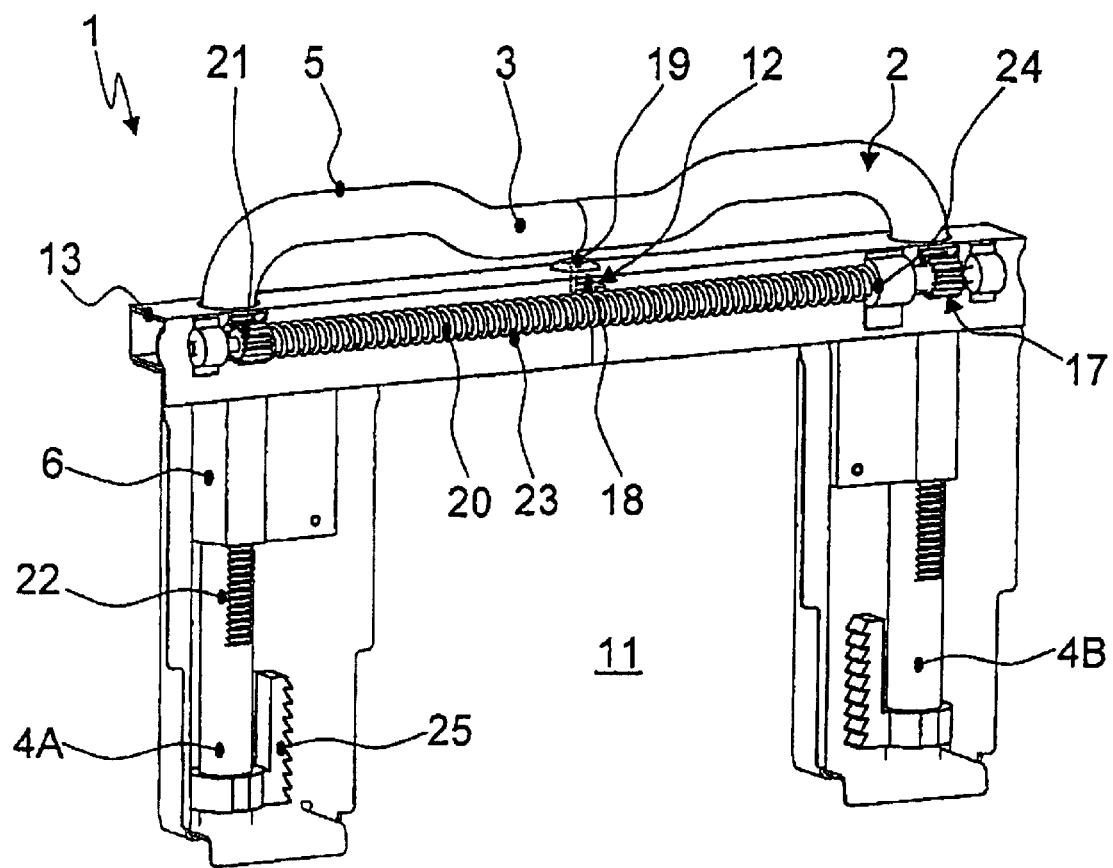
FIG. 1 illustrates a simplified perspective view of a first embodiment of a roll-over protection device for a convertible in a unique position.

FIGS. 1 to 5 each illustrate a roll-over protection device 1 and/or 1' for a convertible motor vehicle that is not illustrated in detail here, where components operating in the like manner are provided with like reference symbols.

The roll-over protection device 1 and/or 1' has a roll bar 2 that essentially spans over the entire width of the vehicle and is designed as a single piece with a nearly U-shape and with a traverse yoke 3 and lateral limbs 4A, 4B. Furthermore, in the embodiment illustrated in FIG. 1, the roll bar 2 has a contour 5 that nearly traces the shape of adjoining head rests, due to which the roll bar 2 can be integrated harmoniously in a lowered non-operational position into a covering for the recline and the head rests.

The limbs 4A, 4B of the roll bar 2 are each arranged in these assigned guiding devices 6, 7, 8 and can be displaced longitudinally along these guiding devices. In both the embodiments, standpipes 8 that are illustrated, for example, in FIG. 4 and arranged fixedly to a vehicle floor structure 9 that is illustrated in more detail, for example, in FIG. 3, form inner guiding devices for the tubular limbs 4A, 4B guided over them. Furthermore, the limbs 4A, 4B are each guided through a guiding device that surrounds them and is designed as a guide cassette 6 and/or 7. Said guiding device stretches in the lowered non-operational position of the roll bar 2 preferably from a middle section up to a section of the limbs 4A, 4B that adjoins the transverse yoke 3. The guide cassettes 6 and/or 7 are also arranged fixedly, whereby they are each attached to the recline structure 10 of the vehicle bodyshell in the embodiments illustrated here.

The recline structure 10 has a loading opening 11 that is left unobstructed in the installed state of the roll-over protection device 1 and/or 1' according to the present invention as well as a safety belt 16 arranged laterally to the said loading opening.

In order to activate the roll bar 2 in case of an accident of the vehicle and/or in the event of a crash situation detected by suitable sensors, a central retaining and activating device 12 is provided that is arranged on a cross bar 13 and/or 13' that stretches parallelly to the transverse yoke 3 of the roll bar 2 in the installation position above the loading opening 11 and whose ends are each attached to the guide cassettes 6 and/or 7 for the limbs 4A, 4B in the embodiments illustrated.

Figure 3:
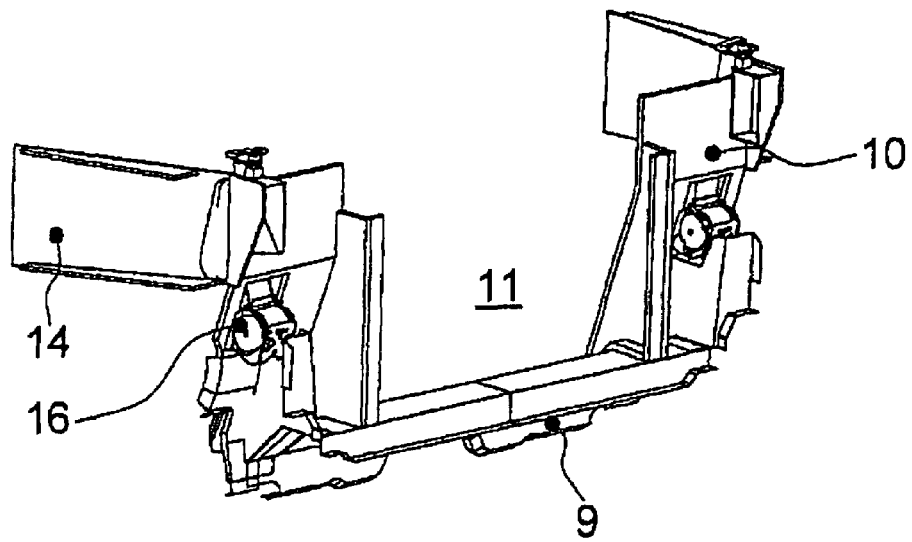
FIG. 3 illustrates a perspective view of an installation situation for the roll-over protection device illustrated in FIG. 2.

The roll bar 2, the lateral guide cassettes 6 and/or 7 that can form one unit with the reinforcing shell 6 as illustrated in FIG. 1 and the cross bar 13 and/or 13' form an inherently stable system that is pre-mountable as a module and can be installed completely into the recline structure 10 of the vehicle body as illustrated, for example in FIG. 3.

In the embodiment illustrated in FIG. 1, the cross bar 13 simultaneously performs the function of a torsion profile of the vehicle bodyshell reinforcing the width of the vehicle in the area of a B-pillar and is designed to be appropriately strong for ensuring the torsional strength of the vehicle. On the other hand, the cross bar 13' of the embodiment illustrated in FIG. 2 to FIG. 5 is merely a connecting profile between the lateral guide cassettes 7, supporting a functional element of the roll-over protection device 1' according to the present invention. In order to avoid any strain, the cross bar 13' is installed in the installation situation of the vehicle bodyshell illustrated in FIG. 3 with a defined mounting tolerance that is implemented, for example, by using rubber elements.

Figure 2:
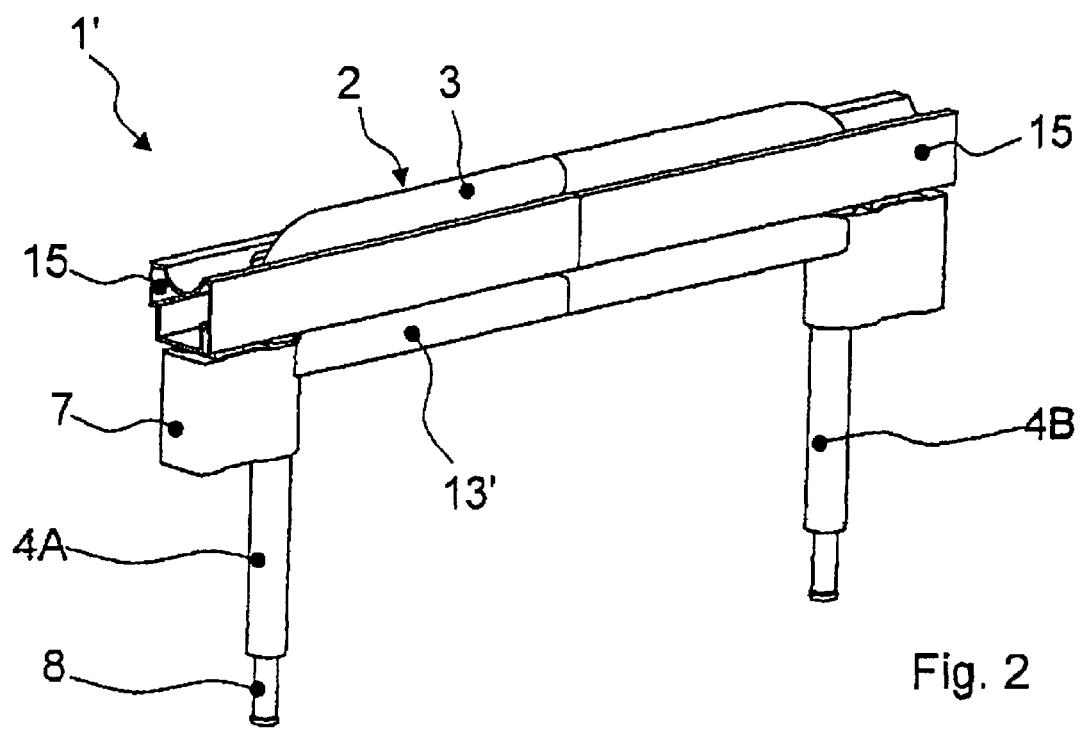
FIG. 2 illustrates a second embodiment of a roll-over protection device for a convertible in a partly perspective view.

In order to transfer torsion forces acting on the vehicle bodyshell, an additional torsion profile 15 is provided in the embodiment illustrated in FIG. 2 to FIG. 5 that connects the lateral vehicle bodyshell structures 14. Said torsion profile 15 is a part of the pre-mountable module that comprises the cross bar 13', the guide cassettes 7 connected to said cross bar and the roll bar 2. For the purpose of pre-assembly, the roll bar 2 is inserted into the torsion profile 15 through recesses that provide clearance to the limbs 4A, 4B, before the limbs 4A, 4B are inserted through corresponding openings of the guide cassettes 7. Furthermore, as illustrated in FIG. 2, the standpipes 8 can be inserted into the tubular limbs 4A, 4B during pre-assembly so that these form a component of the pre-assembled module.

Figure 4:
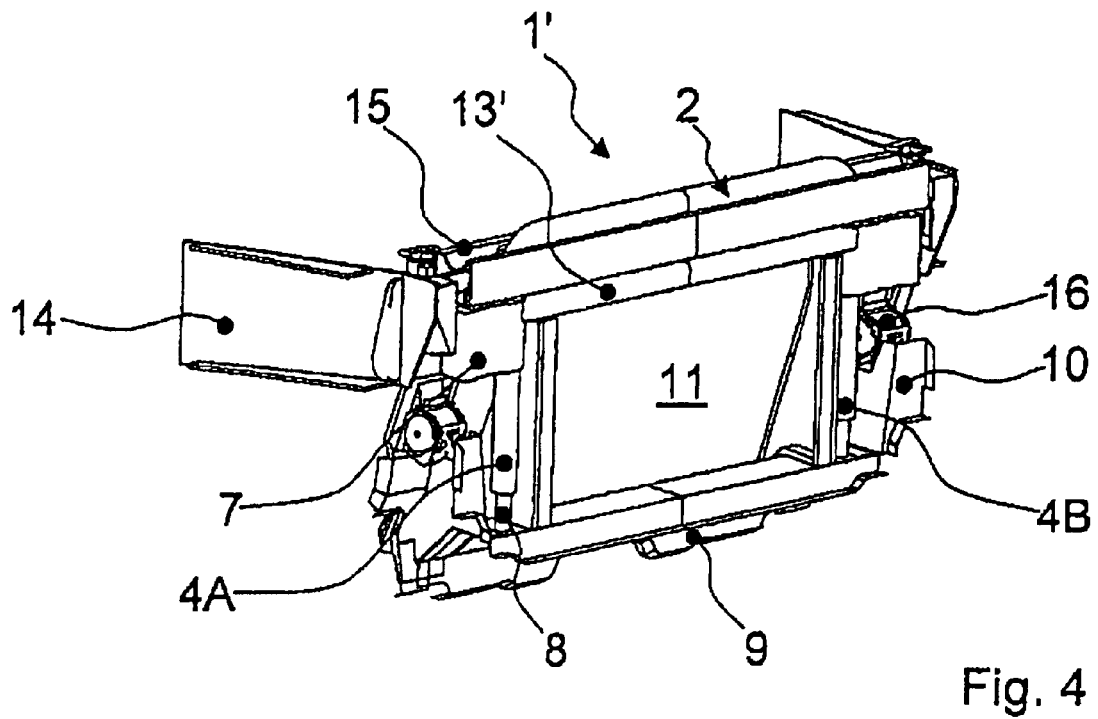
FIG. 4 is a perspective illustration of the roll-over protection device illustrated in FIG. 2 in an installed state in the installation situation illustrated in FIG. 3 in the direction of the vehicle front end.
Figure 5:
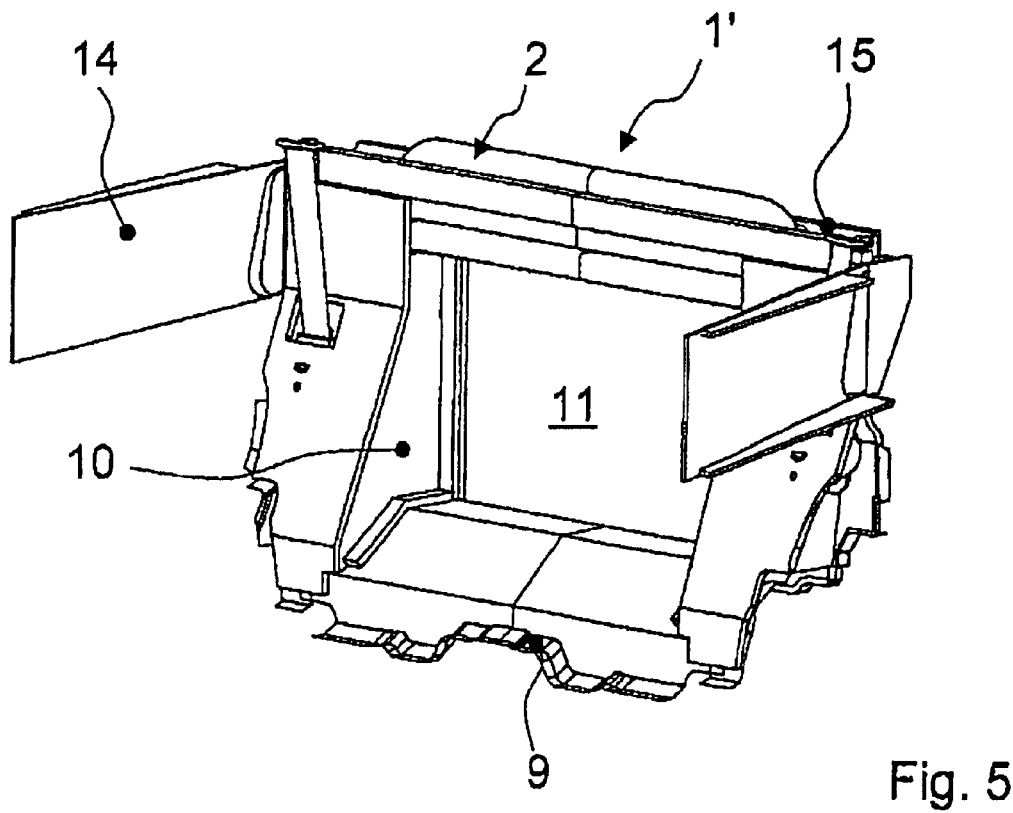
FIG. 5 illustrates a sectional perspective view of the roll-over protection device illustrated in FIG. 4 in the direction of the vehicle rear end.

In the installed state that is integrated into the recline structure 10 and is illustrated in FIG. 4 and FIG. 5, the cross bars 13' and the standpipes 8 are connected fixedly in the known manner to the vehicle bodyshell, whereby the roll-over protection device 1' is inherently rigid and the torsion profile 15 ensures the torsional strength of the vehicle.

In the embodiments illustrated here, the cross bar 13 and/or 13' supports firstly the retaining and activating device 12 illustrated schematically in FIG. 1 and secondly even a synchronizing device 17 that synchronizes the displacement of the limbs 4A, 4B along their guiding devices 6, 7, 8 when the roll bar 2 is deployed.

The central retaining and activating device 12 that is mounted in the center of the width of the vehicle on the cross bar 13 and/or 13' has an actuator 18 that is designed predominantly as electromagnets and acts together with pre-crash sensors. Said actuator controls an engaging element that meshes with the roll bar 2 and/or a retaining plate 19 arranged fixedly on the roll bar 2 in the non-operational position. The engaging element can be, for example, a rocker switch of the conventional design that meshes with a ratchet mechanism or a recess and can be controlled in the known manner. However, those of skill in this art can also select any other known design for the retaining and activating device depending on the requirements applicable in individual cases. In its simplest design, the engaging element can be a hook that meshes with a hole on the retaining plate 19 designed as a flag of material in the non-operational position.

In the embodiments illustrated here, the synchronizing device 17 is provided with a synchronization shaft 20 that is mounted parallelly to the transverse yoke 3 and is fixed on the cross bar 13 and/or 13'. Said synchronization shaft 20 is connected to each of the limbs 4A, 4B by means of a tooth profile 21 that meshes with a notched strip 22 that is arranged on the assigned limb 4A and/or 4B. In this manner a synchronous movement of the limbs 4A and 4B is ensured during the deployment of the roll bar 2.

Furthermore, in the variants of the embodiment illustrated, the synchronization shaft 20 serves as a part of a drive for transferring the roll bar 2 out of the non-operational position into its raised supporting position whereby a spiral spring 23 surrounding the synchronization shaft 20 is provided mainly as a drive element. Said spiral spring is twisted in the non-operational state of the roll bar 2 and is pre-stressed in a twisted form between the synchronization shaft 20 and a fixed point that represents a bearing 24 of the synchronization shaft 20.

If the roll bar 2 is released by the retaining and activating device 12, the spring 23 unwinds and in doing so sets the synchronization shaft 20 in rotation. As a result of the intervention of the tooth profiles 21 of the synchronization shaft 20 into the notched strips 22 on the respective limbs 4A, 4B, the roll bar 2 is displaced into its raised supporting position by the rotation of the synchronization shaft 20. The roll bar is locked in this raised supporting position by means of safety catches 25 that are attached on both sides on the limbs 4A and 4B and that engage into a corresponding counterpiece arranged in the guide cassette 6 and/or 7.

The synchronization shaft 20 that also serves as a part of the drive for the roll bar 2 enables the creation of a drive that is constructively very simple and robust as well as makes separate drives on the individual limbs 4A, 4B unnecessary. Furthermore, the requirement of installation space and the weight of the roll-over protection device 1 and/or 1' are further reduced.

Of course, alternative embodiments are also feasible in which an additional drive element engages at the synchronization shaft. Thus, for example, it is feasible to drive the synchronization shaft using electromotive forces.

REFERENCE SYMBOLS 1, 1' Roll-over protection device
2 Roll bar
3 Transverse yoke
4A, 4B Limbs
5 Contour of the roll bar
6 Guiding device, guide cassette
7 Guiding device, guide cassette
8 Guiding device, standpipe
9 Vehicle floor structure
10 Recline structure
11 Loading opening
12 Retaining and activating device
13, 13' Cross bar
14 Vehicle body structure
15 Torsion profile
16 Safety belt
17 Synchronizing device
18 Actuator
19 Retaining plate
20 Synchronization shaft
21 Tooth profile
22 Notched strip
23 Drive element, spring
24 Fixed point, bearing
25 Safety catch

The invention claimed is:

1. Roll-over protection device for a motor vehicle, said device comprising:
   a roll bar provided with an at least nearly U-shaped design having a transverse yoke and lateral limbs leaving a loading opening unobstructed and extending to span substantially the width of the vehicle, the lateral limbs being displaceable along fixed guiding devices in order to transfer the roll bar out of a lowered non-operational position into a raised supporting position;
   a central retaining and activating device for the roll bar, said central retaining and activating device being controlled by an actuator; and
   a synchronizing device connected to both limbs of the roll bar to synchronize the displacement of the limbs along the guiding devices;
   wherein the synchronizing device is provided with a synchronization shaft that is mounted fixedly parallelly to the transverse yoke and is connected to each of the limbs by means of a tooth profile that meshes with a notched strip that is arranged on the assigned limb.

2. Roll-over protection device for a motor vehicle, said device comprising:
   a roll bar provided with an at least nearly U-shaped design having a transverse yoke and lateral limbs leaving a loading opening unobstructed and extending to span substantially the width of the vehicle, the lateral limbs being displaceable along fixed guiding devices in order to transfer the roll bar out of a lowered non-operational position into a raised supporting position;
   a central retaining and activating device for the roll bar, said central retaining and activating device being controlled by an actuator; and
   a synchronizing device connected to both limbs of the roll bar to synchronize the displacement of the limbs along the guiding devices;
   wherein the central retaining and activating device comprises a retaining plate that is arranged on the roll bar in an area which is at least nearly the center of the width of the vehicle and that is in mesh with a fixedly mounted engaging element in the non-operational position of the roll bar.

3. Roll-over protection device for a motor vehicle, said device comprising:
   a roll bar provided with an at least nearly U-shaped design having a transverse yoke and lateral limbs leaving a loading opening unobstructed and extending to span substantially the width of the vehicle, the lateral limbs being displaceable along fixed guiding devices in order to transfer the roll bar out of a lowered non-operational position into a raised supporting position;
   a central retaining and activating device for the roll bar, said central retaining and activating device being controlled by an actuator; and
   a synchronizing device connected to both limbs of the roll bar to synchronize the displacement of the limbs along the guiding devices;
   characterized in that the central retaining and activating device comprises a retaining plate that is arranged on the roll bar in an area which is at least nearly the center of the width of the vehicle and that is in mesh with a fixedly mounted engaging element in the non-operational position of the roll bar; and
   wherein the central retaining and activating device comprises an engaging element that is fixedly mounted on the cross bar and that is controlled by the actuator and is in mesh with the roll bar in the non-operational position of the latter.

4. Device pursuant to claim 1, further comprising:
   a drive element provided as a drive in order to transfer the roll bar out of a non-operational position into a raised supporting position, whereby said drive element engages at the synchronization shaft.

5. Device pursuant to claim 4, wherein the drive element is a spring that is pre-stressed in a twisted form in the non-operational position of the roll bar between the synchronization shaft and a fixed point and sets the synchronization shaft in rotation when the roll bar is released.

* * * * *